(No Model.)

W. WEIR.
FILTER.

No. 516,140. Patented Mar. 6, 1894.

Witnesses,

Inventor,
William Weir
By Dewey & Co.
Attys

UNITED STATES PATENT OFFICE.

WILLIAM WEIR, OF SAN FRANCISCO, CALIFORNIA.

FILTER.

SPECIFICATION forming part of Letters Patent No. 516,140, dated March 6, 1894.

Application filed February 23, 1893. Serial No. 463,450. (No model.)

*To all whom it may concern:*

Be it known that I, WILLIAM WEIR, a citizen of the United States, residing in the city and county of San Francisco, State of California, have invented an Improvement in Filters; and I hereby declare the following to be a full, clear, and exact description of the same.

My invention relates to that class of filters in which a single valve, provided with two or more ports, controls the inflow or exit of water from a chamber containing suitable filtering media.

My invention consists in the novel construction and arrangement of the interior filtering devices and the surrounding or adjacent spaces, passages and chambers, together with the controlling cock or valve, as I shall hereinafter fully describe and specifically claim.

The general object of my invention is to combine, in a single filter, the aeration and filtration of the water, and the self-cleansing of the filtering medium.

Figure 1:
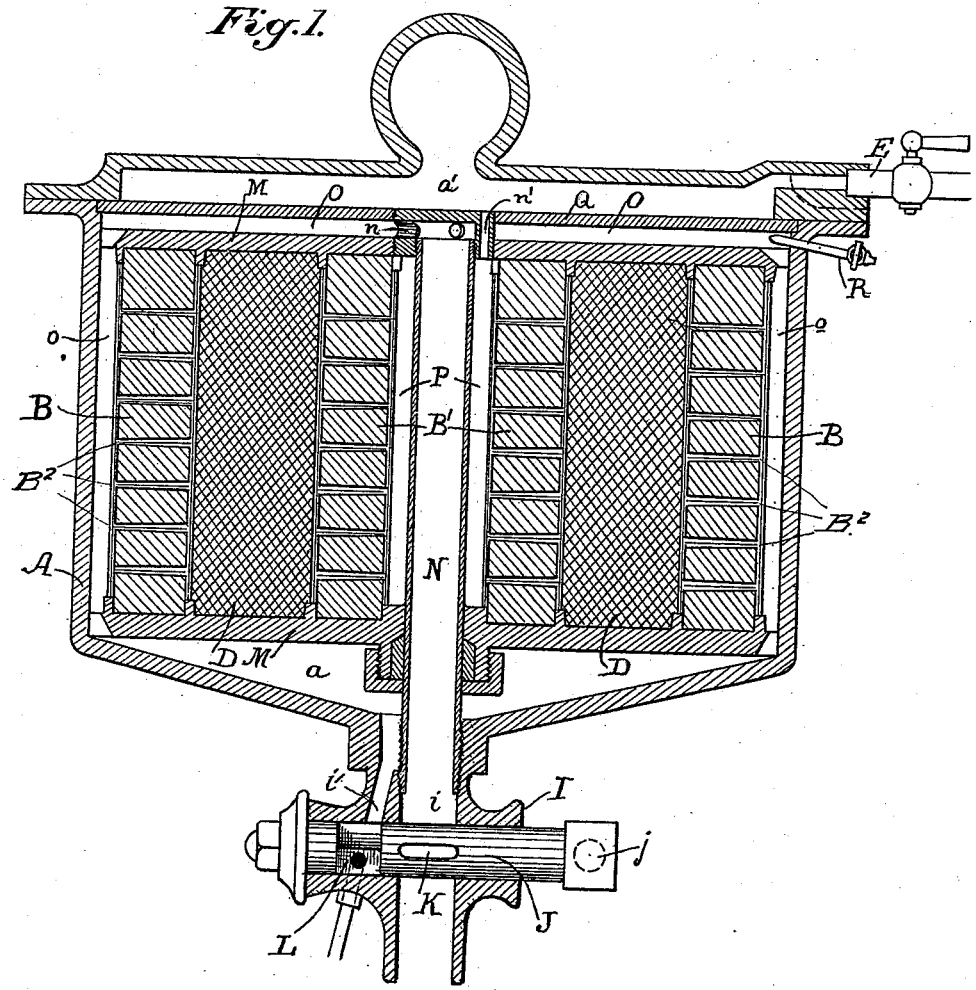
Figure 2:
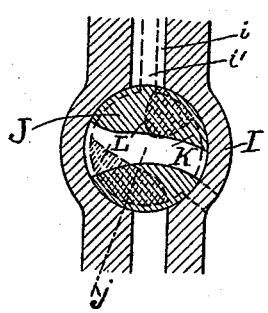
Figure 3:
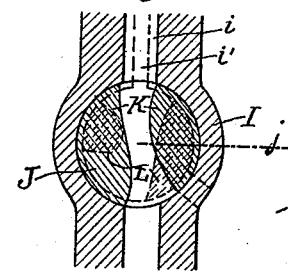
Figure 4:
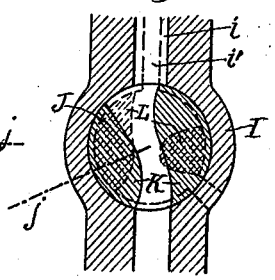

Referring to the accompanying drawings for a more complete explanation of my invention,—Figure 1 is a vertical section of my filter. Fig. 2 is a horizontal diagrammatic section of the controlling valve, showing the first or normal position. Fig. 3 is a similar view showing the second or operative position. Fig. 4 is a similar view showing the third or flushing position.

A is a casing having a hopper-like bottom forming the receiving chamber $a$ which may also be called the air and water chamber.

B and B' are concentric pieces of filtering material, preferably earthenware, with perforations $B^2$ in them which may be filled and packed tight with a filtering medium of suitable character to permit the proper percolation of the water. These may be cylindrical or of other shape in section, though preferably cylindrical. They are held top and bottom between binding plates M, and the space between them is filled with ordinary filtering material, such as animal charcoal, represented by D. In a suitable seat I below, is fitted a valve J, having a handle $j$ for operating it. This seat has a passage $i$ serving as an inlet from the water supply to the lower chamber $a$ of the filter casing, and a second passage $i'$ serving as a drip outlet from said lower chamber, and also as an air inlet to the chamber. The valve J has a port K which controls the communication of the inlet passage, and a second port L which controls the communication of the drip passage. The relative position of these two ports is such that when the port K is fully closed in its normal position, the port L is fully open; when the port K is fully open, the port L is closed and when the port K is partially open behind its normal position, the port L is still open. These positions are illustrated in Figs. 2, 3 and 4.

The passages in the filter casing are a central passage N leading directly upwardly from the water inlet, a top passage O above the top binding plate, and communicating with passage N through a perforated plug $n$, a side passage $o$ just outside of and exposed to the outer surface of the outer filtering piece B, and communicating below with the bottom chamber $a$, which said chamber communicates with the drip passage $i'$.

Within and adjacent to the inner surface of the inner filter piece B' is a passage P, which may or may not contain a filtering medium, such as charcoal, and the top of this passage communicates through other openings $n'$ in the plug $n$ with the top space $a'$ for filtered aerated water, said space being separated from passage O by a diaphragm plate Q.

E is a draw off pipe from upper space $a'$.

The operation is as follows: In the normal position in which inlet port K is closed and drip port L is open, the remaining filtered water returns from space $a'$, through plug $n$, passage P, through the filtering media into outside passage $o$ and thence down into bottom chamber, from whence it continually drips. In the second position in which port K is open and port L closed, the water passes up through passage N, plug $n$, passages O and $o$, thence through the filtering material and up through passage P, plug $n$ into filtered water space $a'$. In the third or flushing position, the water flows up through N, plug $n$, passages O and $o$ in the latter of which it washes off the face of the adjacent filtering piece B, and thence down into the bottom chamber $a$ and out through open port L.

R is a small cock-controlled passage from the passage O. This is to admit air to said passage to assist in the perfect and rapid return of the filtered water as before described.

From the foregoing statement it will be seen that the interior passages N, O and o first become filled with air through the open drip passage i' and chamber a' which said air is confined therein previous to the admission of the water. Then upon opening the supply under pressure, the air will, by the inrush of the water, taking place through said passages be mixed therewith and agitated therein, and will be driven through the filtering media, whereby the water will be aerated while being filtered. The air finally reaches the upper space a', through central passage P and the passages n' and lies therein above the filtered water in said space, and is compressed in said space, the discharge pipe E being closed or partially closed, said compression being effected by the incoming water supply. When this is shut off, the valve J will open its port L to the drip passage, and the compression being relieved the air in space a' expanding down upon the surface of the water therein, will cause a reverse flow of filtered water to pass back through the filtering media, and out through the drip passage, by which act there is also a cleansing of the filtering material at every use. This results without any special care on the part of those who use the filter, and by the ordinary motion of the hand through a quarter revolution of the handle j from left to right and reverse to normal or rest position again ready for the next use.

I am aware that the flushing of the adjacent filtering surfaces or diaphragms by exposing same to a current of unfiltered water has been effected, but in addition to this I provide for aerating the water and also for aerating and cleansing the filtering medium with a reverse current of filtered water throughout its entirety, by a simple and efficient means in turning the plug one-quarter of a revolution in ordinary direction.

Apart from the use of my faucet as a filter faucet, it combines the use of a simple bib for drawing unfiltered water for other household purposes, not requiring filtration, by turning plug one-eighth revolution upward from the normal or rest position, or in opposite direction from normal in drawing filtered water. This is more a matter of convenience, and to save the cost of a superfluous bib.

The advantages of my aerating and self-cleansing system over the usual methods of filtration is the exposure of the receiving passages and contents to air (as between the times of its use) and the oxidizing of the organic matter contained in water or liquid, especially water that may have become more or less stagnant or stale by catchment or being confined without circulation. Such water, although it were clarified would emit a perceptible smell or taste. My system removes this, and provides a means to not only clarify the water and cleanse the filtering medium, but by the intermittent use to which a domestic filter is subjected, each charge of air is more than sufficient to supercharge with air the liquid drawn, and destroy organic germs therein by a surfeit of oxygen gas, making it sparkling, effervescent, vitalizing, decolorizing, and rendering such water palatable, sharp and healthful, which in some measure may be attributed to the chemical action of the air-charged animal charcoal upon the liquid as it passes; in fact, a similar process as nature provides as water dashes and churns over rocks or weirs.

The advantages of the peculiar construction of my filter mechanically considered, are these:—

First,—The arrangement of the casing and internal filter device so as to form a concentric air and water receiving chamber with a hopper bottom. This presents a large or maximum receiving surface for a given pressure of supply, thereby reducing the velocity of water to a minimum when passing through the filtering material, and thereby prolonging the life term of the efficiency of the filtering medium.

Second,—The bringing in of the supply water at the very upper or top edge of the filtering medium so that the first act of the inrushing water is to wash down the surface carrying adhering particles into hopper-shaped sediment chambers which will not rise against the current, but said current will continue to deposit its incoming sediment by gravity at this point in readiness to escape when drip opens.

Third,—The arrangement of the filtering material in a hollow form, the two retaining walls with the space for animal charcoal between and providing a filtered water receptacle by the central space of inside retaining wall, in this way presenting a large uniform filtering resistance equal at all points to the incoming water supply, and a perfect circulation over said filtering medium surface.

Having thus described my invention, what I claim as new, and desire to secure by Letters Patent, is—

1. In a filter, the combination of a casing having a lower compartment and an upper space, separated concentric filtering pieces within said casing having a filtering medium between them, a circumscribing space within the casing to which the outer filtering piece is exposed, said space communicating below with the lower compartment of the casing, a central passage communicating below with the water supply and above with the circumscribing space, a central space around the central passage, exposed to the inner surface of the inner filtering piece and communicating above with the top space of the casing, a discharge from the lower compartment of the casing and a double ported valve controlling said discharge and the inlet to the central passage, substantially as herein described.

2. In a filter, the combination of a casing having a lower compartment and an upper space, separated concentric filtering pieces within said casing having a filtering medium between them, a circumscribing space within the casing to which the outer filtering piece is exposed, said space communicating below with the lower compartment of the casing, a central passage communicating below with the water supply and above with the circumscribing space, a central space around the central passage, exposed to the inner surface of the inner filtering piece and communicating above with the top space of the casing, a discharge from the lower compartment of the casing and a double ported valve controlling said discharge and the inlet to the central passage, the ports of said valve being arranged relatively to each other in such manner that when the inlet port is closed the outlet port is open, when the inlet port is open the outlet port is closed and when the inlet port is partially open, the outlet port is also open, substantially as herein described.

3. In a filter, the combination of a casing having a lower compartment and an upper space, a cock-controlled outlet E from said space, whereby the air may be confined and compressed above the water in said space, separated concentric filtering pieces within the casing having a filtering medium between them, a circumscribing space within the casing to which the outer filtering piece is exposed, said space communicating below with the lower compartment of the casing, a central passage communicating below with the water supply and above with the circumscribing space, a central space around the central passage exposed to the inner surface of the inner filtering piece and communicating above with the top space of the casing, a discharge from the lower compartment of the casing and the double ported valve J controlling said discharge and the inlet to the central passage, substantially as herein described.

4. In a filter, the combination of a casing having a lower compartment and an upper space, a cock-controlled outlet E from said space, whereby the air may be confined and compressed above the water in said space, separated concentric filtering pieces within the casing having a filtering medium between them, a circumscribing space within the casing to which the outer filtering piece is exposed, said space communicating below with the lower compartment of the casing, a central passage, a passage O above the filtering pieces, communicating with the central passage and with the circumscribing space, a cock-controlled air inlet R to said top passage, a central space around the central passage exposed to the inner surface of the inner filtering piece and communicating above with the top space of the casing, a discharge from the lower compartment of the casing and the double ported valve J controlling said discharge and the inlet to the central passage, substantially as herein described.

5. In a filter, the combination of a casing having a lower compartment and an upper space, and a cock-controlled outlet from said space, whereby the air may be confined and compressed above the water in the space, concentric separated filtering pieces supported in the casing so as to leave passage and spaces centrally and peripherally disposed about said pieces and above and below them, forming a continuous water way, a central passage communicating below with the water supply and at its upper end with the water way, a space surrounding the central passage communicating at one end with the upper space of the casing, and a double ported valve controlling the entrance and discharge from the water way, substantially as herein described.

6. In a filter, the combination of a casing, having a lower compartment and an upper space concentric separated filtering pieces supported therein in such manner as to leave passages and spaces centrally and peripherally disposed about said pieces and above and below them forming a continuous water-way, said pieces having the spaces between them packed with a filtering medium and communicating with the water way a cock-controlled air inlet communicating with said water-way, a double ported valve, as described, controlling the entrance and discharge from said water-way, a central space P exposed to the inner filtering piece, and a top space $a'$ with which said central space communicates, said top space having a cock-controlled discharge for confining and compressing the air in said space above the water, substantially as herein described.

In witness whereof I have hereunto set my hand.

WILLIAM WEIR.

Witnesses:
S. H. NOURSE,
WM. F. BOOTH.